United States Patent

Immarco et al.

[11] Patent Number: 5,991,726
[45] Date of Patent: Nov. 23, 1999

[54] SPEECH RECOGNITION DEVICES

[76] Inventors: Peter Immarco, 5580 S. Pacific, #512, Boca Raton, Fla. 33433; Lawrence Cohen, 3311 NE. 26 Ave., Lighthouse Point, Fla. 33074; Theodore J. Gordon, 29 Pearl St., Noank, Conn. 06340

[21] Appl. No.: 08/853,957

[22] Filed: May 9, 1997

[51] Int. Cl.⁶ ................................................. G10L 3/00
[52] U.S. Cl. ........................... 704/270; 704/274; 704/275
[58] Field of Search .................................. 704/246, 270, 704/274, 275

[56] References Cited

U.S. PATENT DOCUMENTS

| | | | |
|---|---|---|---|
| 4,897,630 | 1/1990 | Nykerk | 704/274 |
| 4,961,177 | 10/1990 | Uehara | 704/270 |
| 5,594,789 | 1/1997 | Seaholtz | 704/275 |

*Primary Examiner*—David R. Hudspeth
*Assistant Examiner*—Robert Louis Sax
*Attorney, Agent, or Firm*—John C. Smith

[57] ABSTRACT

A voice recognition system which controls industrial equipment or machinery. A proximity detector is attached to automatically adjust microphone sensitivity and to control automatic shutdown when the machine operator is not present. An enhanced barge-in feature uses a data switch that includes an input audio delay storage. The delay storage prevents loss of initial input data by delaying the input until the data switch switches from output to input modes. A variety of audio/video responses are provided to vary output and enhance attention span. Rules based input data handling provides a flexible response to user input.

4 Claims, 3 Drawing Sheets

SPEECH RECOGNITION DEVICES

CROSS-REFERENCE TO RELATED APPLICATIONS

This application is related to commonly owned copending application entitled "SYSTEM AND DEVICE FOR IN-STORE PRODUCT LOCATOR", filed May 8, 1997, bearing U.S. Ser. No. 08/853,676 and naming Peter Immarco, Lawrence Cohen, and Theodore J. Gordon, the named inventors herein, as joint inventors, the contents of which is specifically incorporated by reference herein in its entirety, and commonly owned copending application entitled "SYSTEM AND DEVICE FOR ADVANCED VOICE RECOGNITION WORD SPOTTING", filed May 8, 1997, bearing U.S. Ser. 08/853,959 and naming Peter Immarco, Lawrence Cohen, and Theodore J. Gordon, the named inventors herein, as joint inventors, the contents of which is specifically incorporated by reference herein in its entirety.

BACKGROUND OF THE INVENTION

1. Technical Field

The present invention relates to voice recognition and in particular to voice recognition systems used to control machinery. In addition, improved barge-in features for enhancing the voice recognition system are shown.

2. Background Art

Voice recognition systems have been developed for a number of office environment uses. Voice recognition engines analyze digitized speech files and return to their calling programs the resulting word or phrase. A digitized speech file contains a digital representation of an utterance. An utterance is a single body of speech spoken by a person. Such an utterance can be a word, a sentence, a paragraph, or an even larger body of speech.

Voice recognition engines which translate utterances can be classified by two characteristics: the plurality of speakers who can use the system and the type of speech that the system can accept. Voice recognition engines can be either speaker dependent or speaker independent. Speaker dependent engines require a voice recognition engine to be "trained" on a speaker's voice before the engines can recognize the speaker's speech. Speaker independent engines can recognize speech from any speaker without needing to be "trained" on the voices.

Voice recognition engines can also accept either continuous or discrete speech. Engines which use discrete speech require that the speaker pause between every word for at least 1/10th of a second. Continuous speech engines allow the speaker to talk at a normal rate of up to 200 words per minute. There are two ways for handling continuous speech, in the first an utterance is compared against a library of phrases and the phrase that is the closest to the utterance is returned. In the second, word spotting is used in which the speech recognition engine examines whole speech segments to identify any occurrences of the words the engine has been instructed to look for. The set of words the engine is looking for is known as the "Active Vocabulary." Word spotting is drastically harder to perform compared to the first method because the word or words to be identified have to be extracted from a messy seamless stream of phonemes regardless of: the placement of the words in the utterance, the order of the words, or the general shape or quality of the phonemes in the digitized speech file (such as due to the slurred or accented voice of the speaker).

Currently, voice recognition engines that perform speaker independent, continuous word spotting are limited to active vocabularies of 50 words or less. This means that these types of engines can look for, i.e. "spot", a maximum of 50 distinct words at the same time when analyzing an utterance. This limit of 50 words relegates continuous speech word spotting engines to carefully controlled, almost contrived, applications, such as spotting the digits 0 through 9 or word spotting an item from a small list of choices.

At this point, it is important to understand the difference between a resident vocabulary and the size of a word spotting voice recognition engine's active vocabulary. The resident vocabulary is the number of words that the word spotting voice recognition engine can have stored in memory and available for use when they are needed. However, the word spotting voice recognition engine is unable to look for all of those words at the same time. Therefore, only some of the words in the resident vocabulary are activated. The remaining vocabulary words remain inactive. The number of activated words is the number of words that a word spotting voice recognition engine can simultaneously look for in an utterance. If the speaker uses any words that have not been activated by the word spotting voice recognition engine, these words will not be recognized.

Speaker dependent, discrete speech voice recognition engines currently can have large active vocabularies that may contain many thousands of words, as opposed to continuous speech, word spotting systems. The primary disadvantage to such discrete speech systems is that these speech systems force the speaker to speak in a very unnatural, tiring manner. Except for a few limited cases of dictation, this makes them unusable for most commercial applications A second disadvantage with such systems force the user to train the voice recognition engine on their voice for several hours and then require the user to pause between each word while speaking slowly. These systems can only accept such broken speech at a maximum rate of 100 words per minute. In a normal speaking situation, nobody pauses between every word and most people speak at rates between 120 and 200 words a minute.

Another disadvantage of such speaker dependent systems is that there are very few commercial applications that can afford the time it takes to train the engine on a speaker's voice. For example, asking the user of an automated teller machine to undergo a training session for an hour or two before using the system is completely unfeasible. In fact, anything short of no training time required is commercially useless. This is why the vast majority of possible applications of speech recognition have not been realized yet.

One important area in which voice recognition systems have been largely ignored is in the area of industrial and manufacturing use. Manufacturing machines such as lathes, milling machines, etc, typically require manual control by an operator. Physical drawbacks to this method of use include the possibility of injury to the operator if an accident should occur when controlling the machine. In addition, manufacturing jobs often require repetitive operations which can lead to other disabilities, such as carpel tunnel syndrome. It would be advantageous to have a system capable of allowing a machine operator to control machinery via voice commands rather than through manual operation.

A further area of concern is the ability of the computer to recognize when a user is speaking and to halt output to receive the user input. This process is called "barge-in." Prior art systems have required the use of two channels or even two computers to achieve this function. One channel or computer dedicated to inputting data and the other channel or computer dedicated to outputting data. In an industrial or manufacturing environment, the ability to interrupt the particular machine in use can be important for safety and economic reasons. It would be advantageous to have an inexpensive voice recognition system which allows barge-in with a minimal amount of system resources.

The prior art has failed to provide an advanced voice recognition system that is readily usable by manufacturing or industrial equipment or which allows barge-in to be conducted more effectively.

SUMMARY OF THE INVENTION

A voice recognition system which controls industrial equipment or machinery. A proximity detector is attached to automatically adjust microphone sensitivity and to control automatic shutdown when the machine operator is not present. An enhanced barge-in feature uses a VOX switch that includes an input audio delay storage. The delay storage prevents loss of initial input data by delaying the input until the VOX switches from output to input modes. A variety of audio/video responses are provided to vary output and enhance attention span.

DESCRIPTION OF THE PREFERRED EMBODIMENT

Figure 1:
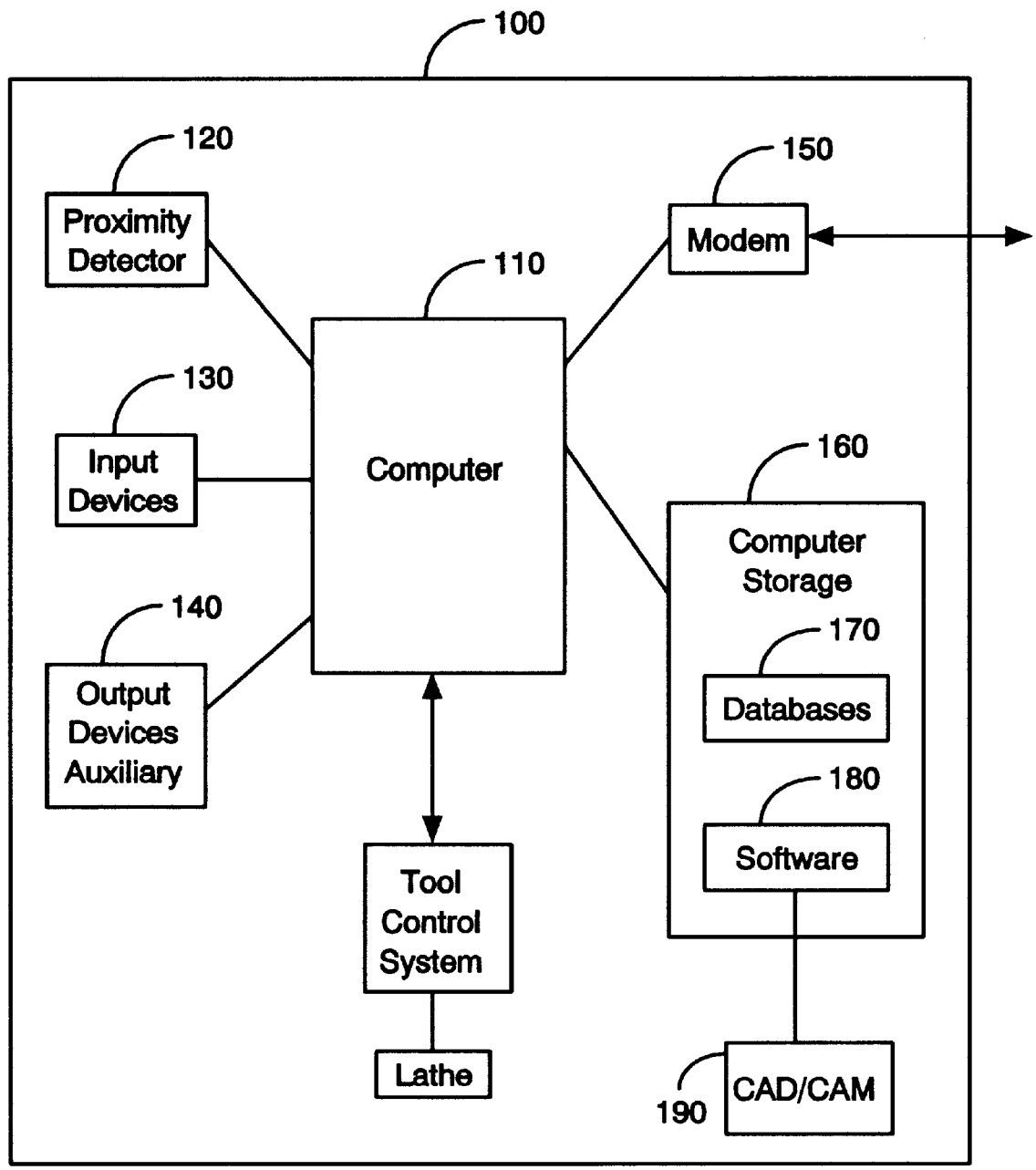
FIG. 1 is a block diagram of the speech input machine control device.

For ease of discussion, in the figures discussed below, elements having the same number perform essentially the same functions.

The related applications, referred to above, teach an automated means for directing customers to the in-store location of desired products using voice recognition. The system described provided a human-interface, i.e., it used primarily voice input from the customer/user and responded after analyzing the customer's natural speech with output in the form of synthetic voice or prerecorded voice along with video images of a human store clerk. In addition to the voice and visual output, printed material such as a coupon or recipe was available. Alternate forms of input, by touch screen, keypad, or keyboard, was available as well.

The related applications focused particularly word spotting and on the use of this voice-controlled human-interface to direct store customers to the location of a product they inquired about and to provide coupons, recipes and other printed information to the customers. The interface was created to allow customers to interact with the computer system by speaking in conversational English. Customers were not limited to a small set of voice command words, nor did they need to train the computer system to their voice. The computer system's ability to respond to conversational English and to respond with voice and video resulted in more human-like interface than in past systems.

The same techniques used in the related applications can be used in at least two other important ways: (1) as a command system for machinery or equipment, and (2) in other applications in which the human-interface produced by response to voice input results in a seemingly intelligent response. Both further applications of this human-interface are described below.

In addition to these two applications, this invention includes descriptions of three novel features of such speech recognition systems, mainly: (1) a novel method for achieving "barge in", (2) a technique for improving user attention span, and (3) the use of such voice-recognition systems in sales situations.

The human-interface supplied by the disclosed speech recognition computer system can be used to control machinery or other equipment. For example, a lathe can be coupled with a speech recognition system having the capability of the many features for example:

1. Through the aggregation in an external data base, over time, of word pronunciations that are initially unrecognized;
2. Means of a self-extending thesaurus that records spoken words with equivalent meanings;
3. Calibration of a speaker's voice through the use of a common salutation.
4 Parallel searching of disaggregated databases;
5. Searching the stored data in a sequence determined by the likelihood that a given word will be spoken—thus the most likely words are searched first;
6. Detection of the presence of a user who wishes to use the machine;
7. Use of active noise cancellation and directional microphones to minimize the extraneous noise entering the system; and
8. Word spotting, that is, the extraction of key words from a sequence of natural language speech.

With these capabilities included in a machine control system, a lathe operator can speak the words, "Take off another thousandth," in order to command a lathe cutting tool to move in the direction that would remove $1/1000$ of an inch of material from the work in progress.

The functions of decoding the spoken input, accounting for different pronunciations, noise cancellation, etc., are identical with the techniques described in the related application's disclosures. In this application, a different output is involved: the motion of a tool, or the activation of a machine function. As in the previous disclosure, the output might also include printed material (a record of the machine operations); a video clip (illustrating the shape that the part is assuming) or a voice (that confirms the instruction). The use of a lathe with the voice-recognition system is only one use. Other machine tools, mobile machinery, or household appliances can be controlled in this same manner.

Figure 2:
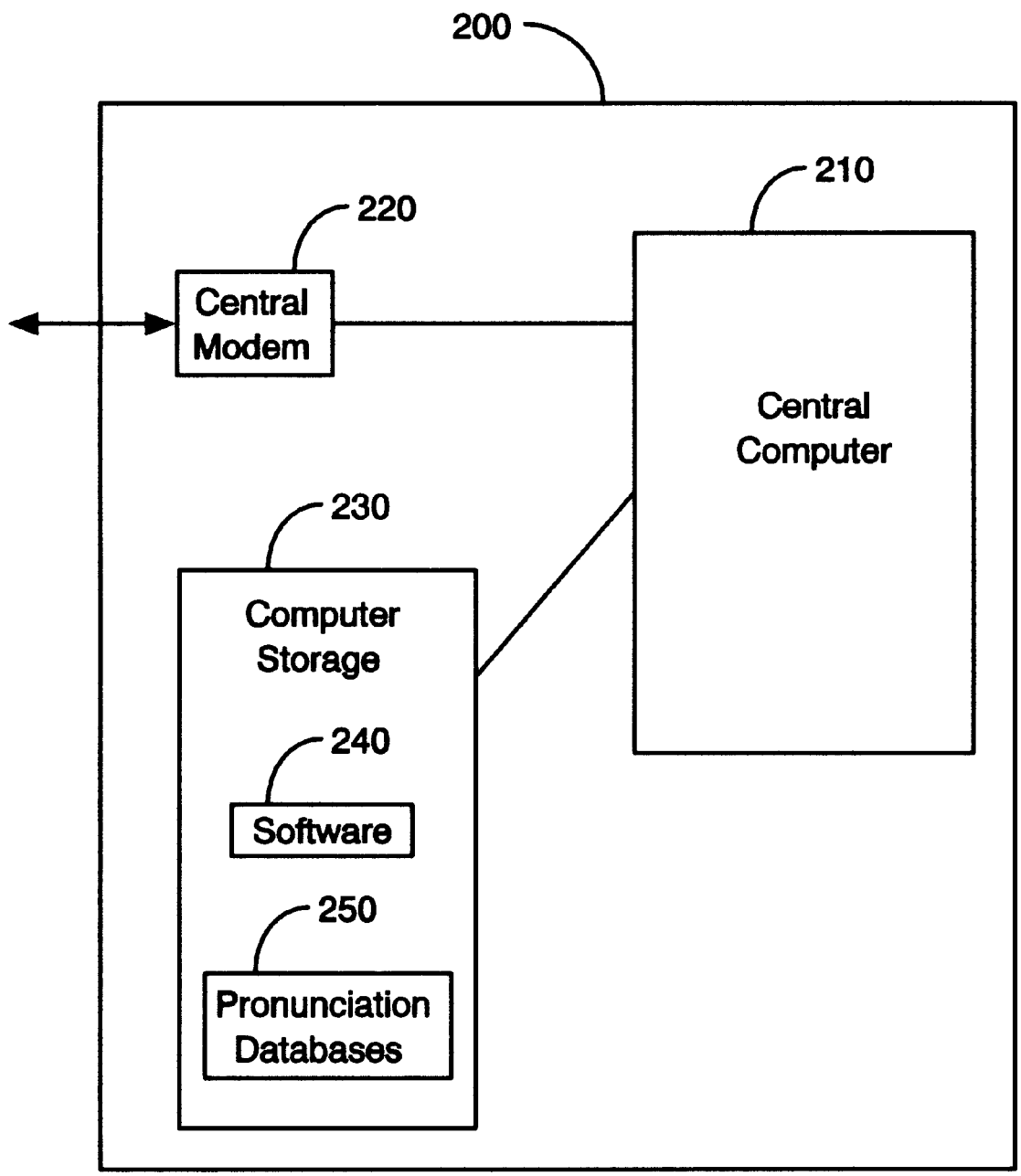
FIG. 2 is a block diagram of the central computer system which manages a network of tools in a factory or series of factories.

Referring now to FIGS. 1 and 2. FIG. 1 is a block diagram of the speech input machine control device. FIG. 2 is a block diagram of the central computer system which manages a network of tools in a factory or series of factories.

FIG. 1 is a block diagram of a preferred embodiment of a device for machine control using speech input 100 which can be installed in a factory or machine shop. The purpose of this system is to augment human operators of machines by providing them a voice actuated means of obtaining data and specifications during human controlled operations and, further to provide a "hands off" means of controlling machines. An important advantage of the hands off technique is that it not only reduces the risk of accidental injury, but may also reduce the risk of repetitive injuries, such as carpel tunnel syndrome.

The speech input machine control device 100 is based on a computer 110. Computer 110 is connected to a proximity detector 120, input devices 130 such as a microphone, and output devices 140 such as a speaker, printer and screen display. Computer 110 is also connected to a modem 150 and computer storage 160 containing databases 170 and software 180 in RAM, in ROM, on disks, on tape, on CD-ROM or stored in other computer media.

Proximity detector 120 senses the presence of the operator. Not only does this sensing place the system into operation, but it also is used to detect whether the operator has stepped away from the machine so that, for safety purposes, the machine operation can be programmed to cease if no operator is present.

In normal operation, the proximity detector 120 initiates operation and allows the machine operation to continue. This sequence may begin with computer 110 using output devices 140 to interact with the operator. The operator may perform a query on the speech input machine control device by speaking into input devices 120. Input devices 120 might also include a keyboard or touch sensitive screen to provide alternative methods of input.

Software 180 analyzes the input from operator and searches the speech databases 170 for the words that describe the desired operation. In one embodiment, databases 170 can contain other information about the operation that can be shared with the operator, such as, "That operation is unsafe; the material is too thin to support the operation." In addition, the software can also be used as a teaching system to train operators in the use of the equipment.

Databases 170 are maintained by software 180 or a CAD/CAM system 190. The CAD/CAM system 190, in one embodiment, can transfer information concerning part specifications, dimensions, and special instructions to the databases 170. The tool control system 195 contains the drive motors, actuators and instrumentation required to provide mechanical operation of the machine as well as data on its set up and operation to the computer. These data might include, for example, temperature of the cutting bit of a lathe tool. These feedback data can also be used to activate an output device 140 to inform the operator of the state of the operation, and if necessary, to trigger warnings. The machine control using speech input device 100 can also be maintained via modem 150.

FIG. 2 is a block diagram of the central computer system 200 which manages a network of in-factory devices in one embodiment of the invention. Central computer system 200 may consist of a central computer 210 connected to a central modem 220 and central storage 230. Central modem 210 allows communication with one or more in-factory speech input machine control devices 100. Central storage 230 consists of ROM, RAM, disk drives, CD ROMs or other computer storage media.

Central storage 230 stores, among other items, software 240 and pronunciation database 250 which allows the updating of databases 170 in the network of in-factory speech input machine control devices 100.

Central computer system 200 can collect information, such as new machine operations, specifications, tolerances, safety procedures and the like, and download this information to the speech input machine control device 100 via central modem 220 and modem 150. Additionally, if speech input machine control device 100 is unable to match an operator's command with a previously stored command, speech input machine control device 100 can contact central computer system 200, either in real-time or batch mode, and a human operator of central computer system 200 can make a decision about whether the input constitutes a legitimate new entry into pronunciation database 250. If the word used by the operator is in database 170 or 250 but not recognized because of a different pronunciation, the human operator can elect to have central computer system 200 add the pronunciation to pronunciation database 250 and later transferred to databases 170. This improves the ability to recognize this pronunciation in the future and allows for the addition of synonyms to a thesaurus database 170. In one embodiment, the human operator may also be able to communicate with the operator at the machine position.

A typical interaction between a machine operator and the speech input machine control device is now described. In one embodiment, output devices 140 includes a screen display playing a prerecorded video sequence of the desired machine operation or other instructions and warnings while speakers of output devices 140 transmit, by speech, the desired information. The output devices might also include printed information. When proximity detector 120 is activated, the system would be ready to receive the common salutation from the operator, such as "Computer, turn on." This salutation would be used as a substitute for voice "training" that is common in today's speech recognition software applications. The video clip shown in response to this salutation could appear to say to the operator an introduction such as, "What operation would you like to perform?" The operator might respond, "I'll be using the lathe. I will turn part 567123 and take it to the required dimensions." The speech input machine control device would detect the statement or key words in the statement and look up the appropriate responses. It might then respond, for example, "Here is a short video that shows some dangers in this operation," and proceed to display the clip. When completed, the machine might then say, "Please set up the operation." The operator would set up the lathe, using the information just conveyed by the device and then say, "All set. Start the lathe."

The device would check the set up using feed back information from the tool control system 195 and if an error were detected, it might say, "I think the tool is set at the wrong angle. Here's a picture of the correct setup," and proceed to show a video of the correct setup. The operator would then correct the setup and indicate the readiness to proceed saying something like, "OK let's go." The lathe would start spinning. The operator could then say, "Remove ten thousands," etc. At the end of the sequence, the device could print the results of the operation.

Although the example was based on using a lathe, clearly it would have major application to much more complex and dangerous operations such as control of nuclear power plants, space vehicle launch and operations, and the operation of chemical plants. In this way the speech input machine control device's human-interface allows it to seem as a human-ike assistant to the human operator.

In the second application described in this disclosure, the speech input system uses most of the previously described features, but instead of only using a set of prerecorded responses to key words, this application adds the ability of seemingly intelligent responses. For example, suppose that this application is used in a child's doll. In such a doll, if the child while playing with the doll were to say, "I'm sad today," some seemingly intelligent responses from the doll might be "Why are you sad?" "I'm sad sometimes too." or "Have you told your mother you're sad?" Or, in this application, the doll might itself initiate the conversation with the child by a statement such as "What is your name?" followed then by "What's new?" or "What did you do today?" As a result of having catalogued probable responses of children through observation and statistical analysis, the computer program spots key words spoken by the child and responds accordingly by choosing randomly from a set of appropriate responses.

In a sense this application utilizes "rule based" artificial intelligence. For example, if the child says the key word "dog" the computer code contains the rules:

Rule 1: If "dog" is detected, respond with one of five responses:
"What's the dog's name?"
"I love dogs, too."
"I once had a dog name Spot."
"Dogs have been pets for a long, long time."
"Did you know that dogs and wolves are close relatives."

Rule 2: After one possible response is given, eliminate it for possible random selection until all other choices have been made.

With rules like these, the responses can be "chained." An example conversation based on the above rules might be:
Doll: "So what's new?"
Child: "I have a dog."
Doll: "Did you know that dogs and wolves are close relatives."
Child: "My dog is not a wolf"
Doll: "What's the dog's name?"
Child: "Spot. He loves to play with me."

The word "play" in the last sentence might also be a key word. If so, the program would then branch to the possible responses for this trigger. But suppose that the final sentence contains no key word. Then "escape" routines are enabled. For example, the subject might be changed by asking "Do you like sports?" or "Do you like school?" Another escape strategy is to analyze the sentence spoken by the child and select a word located in a particular point in a sentence, usually the final word, and repeat it back to the child in the form of a question. This is a technique used earlier in pseudo-psychiatric interview programs. If the child says "My daddy just bought a new Chevrolet," the doll might respond "Chevrolet?" Since relevant answers are drawn randomly from a set of possible responses, the dialog between child and doll is not often repeated. Furthermore, when random changes of subject and questions are thrown in, the conversation seems to be intelligent.

In the doll application, the computer elements and data bases are stored in nonvolatile memory chips in the doll. A proximity detector or a "detect vertical" switch can be used to "arm" the doll. Each doll might have its own name and when the child addresses the doll with that name, it serves as a salutation "training" as described previously.

The application demonstrated by the inventor also incorporates a subprogram that recognizes vulgarities and in response to such utterances, evokes a response that admonishes the user to avoid such language. Two demonstration dialogs resulting from the testing of this application with actual children are included as Tables 1 and 2. In these Tables, the doll's "voice" is shown in uppercase letters and the child's voice is represented in lowercase. As can be seen in Tables 1 and 2, the child's input is analyzed and influences the next response by the doll. Clearly the pseudo-intelligent system described here can be used for purposes that go beyond simple doll-play. For example, the doll could be programmed to tell stories, play simple games, such as knock-knock jokes, teach spelling, encourage moral behavior, etc.

TABLE 1

DIALOG

YOU'RE PRETTY. CAN YOU TELL ME YOUR NAME?
red
RED, I LIKE THAT NAME. MY NAME IS ELISA.
SO WHAT DO YOU DO FOR FUN, RED?
I read a lot
I LIKE TO READ TOO -- WHAT HAVE YOU READ LATELY?
rain falls on cedars
THAT'S AN UNUSUAL THING TO SAY:
RAIN FALLS ON CEDARS
well its a dandy book, a little weird
DO YOU LIKE TO READ?
only good books
DO YOU LIKE TO READ?
yes, I said
COOL. WHAT ELSE IS HOT?
well I also dance and play ball
WHAT ARE YOUR FRIENDS UP TO, RED?
they are all dumb
I DON'T KNOW ABOUT THAT -- THEY ARE ALL DUMB.
well most of them anyway
BEEN TO ANY GOOD PARTIES LATELY, RED?
Mary had one and a few girls danced with boys. big deal
HOW ARE YOU FEELING, RED?
happy
I LIKE IT WHEN YOU'RE HAPPY. WHY ARE YOU SO HAPPY?
well I like to play with you
BYE FOR NOW. I HAVE TO GO TO SLEEP

TABLE 2

DIALOG

YOU'RE SURE EXOTIC LOOKING.
WHAT'S YOUR NAME, DOLL?
Toni
TONI, I'M PLEASED TO MEET YOU. MY NAME IS HAILEY.
WHAT ARE YOU PLANNING FOR YOUR NEXT VACATION, TONI?
my dad is going to take us to a ball game
MY SISTER ONCE SAID THE SAME THING --
MY DAD IS GOING TO TAKE US TO A BALL GAME.
and did she go
WHAT ARE YOUR HOBBIES, TONI?
I like to play with dolls
WHAT ARE YOUR DOLLS' NAMES?
Teresa and Francis
DO YOU REALLY MEAN TERESA AND FRANCIS?
why are those names so strange
DO YOU WANT TO PLAY A GAME, TONI?
ok, what
MY BROTHER ONCE TOLD ME THE IDENTICAL THING --
OK WHAT
and what happened to him
DON'T KNOW. WHAT DO YOU THINK?
he probably went to jail
HOW ARE YOU FEELING, TONI?
a little sad
I REALLY HATE TO SEE YOU SO SAD.
CAN YOU DO ANYTHING ABOUT IT?
well if I could play I'd feel better
LET'S PLAY AGAIN.

The term "barge-in" refers to the ability of a speech recognition system to accept the spoken input from a user without requiring that the system be in a stand-by mode. Early speech recognition systems included the voice and video output statement "Reply after you hear the beep." While this approach is simple, it requires that the user wait before responding and this introduces an unnatural element into an otherwise flowing dialog. Systems employing "barge-in" allow the user to answer at any time, including the interval during which the system is "talking." The conventional approaches to barge-in that have been discussed require the use of two channels, one of which is assigned to the listening function. Once user speech is detected, the system switches to the input mode in which the system ceases its output and "listens" to the user's speech. This requires two separate computers, or at least two separate boards within the computer that are dedicated to their unique functions. The present invention utilizes a solid state switching system that allows the system to change from the output mode to the input mode without losing any of the user's speech.

Voice operated switches (VOX) are common in many applications, such as in amateur radio. VOX switches are placed in the microphone circuit so that when the radio operator speaks into the microphone, the transceiver switches from receive to transmit. The receiver is placed into a standby mode, the transmitter is activated and the words spoken into the microphone are transmitted. The switching occurs rapidly after speech input is detected. Systems of this sort also use "anti-VOX" in which a portion of the receivers output is fed out of phase to the microphone circuit so that the audio output from the receiver does not trip the VOX circuit. The problem in using this approach in speech recognition systems is that the first part of the first word is missed since a finite time is required to accomplish the switching.

The present invention provides a means for recording and delaying the speech input to the system. The actually spoken words are continuously recorded on a system equivalent to an endless tape. When speech is detected from the microphone circuit, the system is placed into its listen mode, but the audio input to the system comes from the slightly delayed recording rather than directly from the microphone. In this way no speech is lost to the system.

Figure 3:
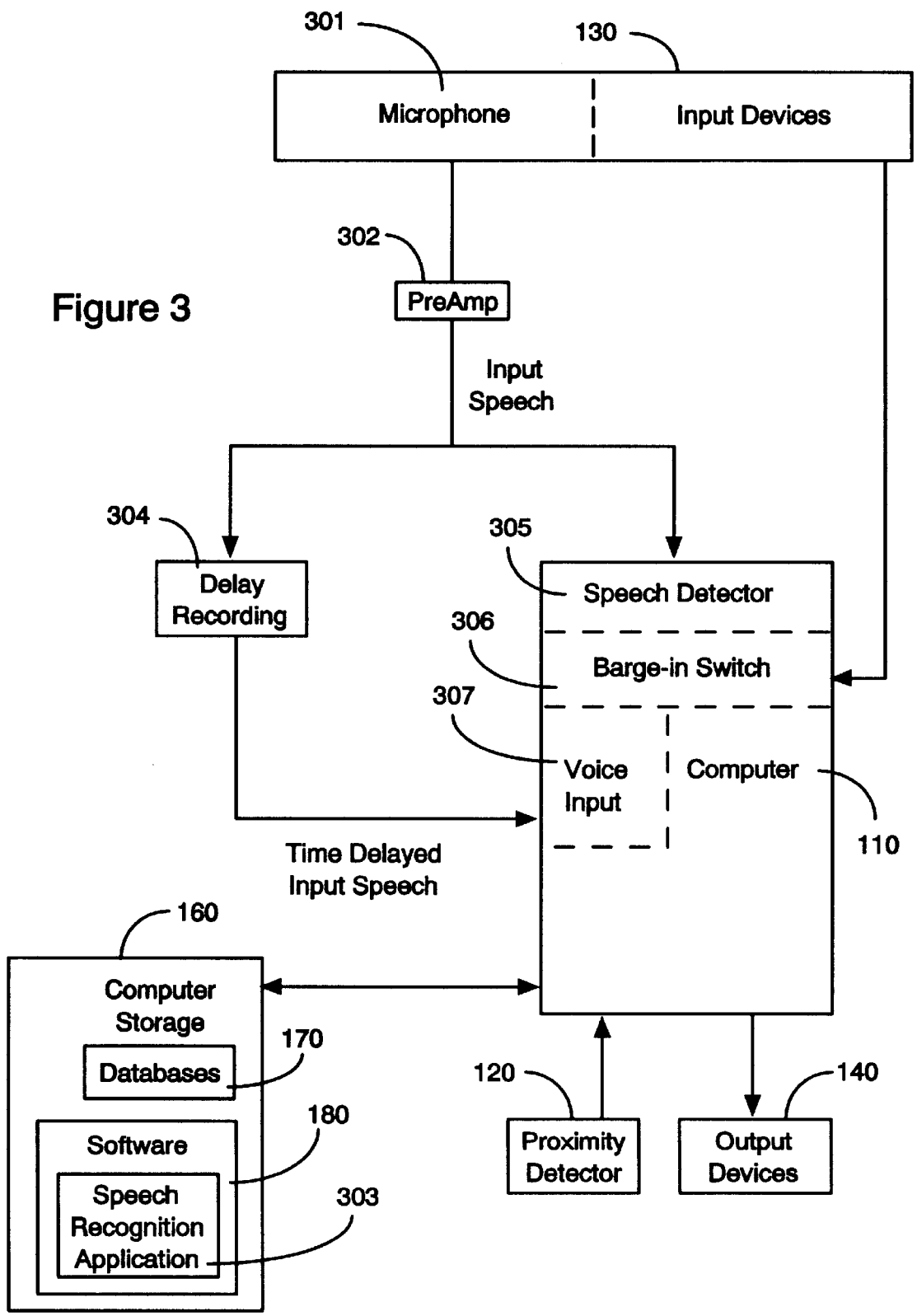
FIG. 3 is a block diagram of a method of providing "barge-in" to the system.

Please refer to FIG. 3. A noise canceling microphone 301 detects incoming speech. It may be amplified by optional preamplifier (preamp) 302. Using a preamplifier has the advantage of providing means for achieving pre-emphasis that makes the microphone output more linear across the voice spectrum but also providing deliberate emphasis on certain parts of the voice spectrum to make later recognition by the system more reliable.

The output from preamp 302 is fed to the system speech recognition application 303 so that when speech is detected 305 the system switches 306 from output to input. Of course this switching takes time so that if the direct feed from the preamp were used as the system's voice input 307, the first part of the sound would be lost.

Instead, the voice information is obtained from delay mechanism 304. Although a solid state approach is used, its function is most easily understood if the delay mechanism is pictured as an endless loop tape recorder with a separate record and playback head. Fresh information is always being recorded and the playback is derived from the separate playback head located a short distance downstream of the recording head. The length of the short delay that is thus introduced is determined by the tape speed and the spacing between the heads. Since all of the speech information provided by the user during the interval is on the tape, nothing is lost by the system.

A typical time sequence might be as follows:

Recording of the last second of microphone output is continuous 0 millisecond    User speech is detected
0.1 millisecond  Signal is sent to the system and the system is switched -continued to input (listen) mode
0.2 millisecond  Playback head senses material recorded 0.2
                milliseconds earlier and conveys this to the system.

As noted earlier, the actual means of delaying the information will be solid state. The ISD 1020 chip, for example can record and playback 20 seconds of audio. The audio segment required can be accessed by addressing the chip digitally. The chip is described as a miniature tape recorder with the ability to pre-position the playback head anywhere on its 20 second tape. The chip requires only minimal external components, audio, and power (between 5 and 20 volts at 100 ma).

In the inventions described in this and the related disclosures, a video clip may be presented in response to a spoken word or phrase. For example, as noted earlier, an actress might be shown in a video clip responding to a customer's request to be directed to a particular location in a store. We have found that use of one of a set of equivalent video clips, chosen randomly, avoids user tedium and boredom. For example, if the system always presented the same introduction video and voice saying "Welcome to our store," the smiling face of the actress would soon loose its charm and the users would be discouraged from further use. However by providing the system with a dozen or a hundred alternative clips and choosing randomly from the alternative clips for each use, the users gain a sense of spontaneity. The dullness that might otherwise have occurred is avoided.

In addition, the inventors envision using a multiplicity of actors and actresses to convey the messages on the video clips so that the personality of the person shown on the video clip can be chosen to be appropriate to the message being conveyed. For example, if a cake mix is the subject of the video clip, a famous bake cook might deliver the, message. Cartoon characters, and political and sports figures can also be used. This will also help avoid tedium.

The uses of the system can go well beyond those described previously. For example, the system and its video clips can be used to present sales information. A machine located in the lawn equipment department of a department store might be used to answer the request of a customer to compare the features of the various lawn mowers that are for sale in the store. Brief video clips could show the lawn mowers in operation, compare their features, and finally take the order.

The system can also replace human operated systems such as those used in drive up windows of fast food restaurants, amusement park vending areas, etc. In this manner, the user can enter the user's order directly into the computer instead of telling an operator and then having the operator enter the data. Likewise, the user can make payments directly either through an automated bill reading machine (for cash) or with an ATM type reader which would entirely eliminate the need for the restaurant or other service organization to have a human operator.

While the invention has been described with respect to a preferred embodiment thereof, it will be understood by those skilled in the art that various changes in detail may be made therein without departing from the spirit, scope, and teaching of the invention. Accordingly, the invention herein disclosed is to be limited only as specified in the following claims.

We claim:

1. A speech recognition system for use with machinery, comprising:

a computer;

a microphone, attached by the computer, for inputting audio data from a user;

output means, attached to the computer, for outputting information to the user;

a database;

a proximity detector having means to detect the presence of the user;

means to initiate communication with the user when the proximity detector detects the approach of the user;

a data switch having an input audio mode and an output audio mode, further comprising;

means to switch from output audio mode to input audio mode when input audio is detected;

audio delay means to delay input audio for a predetermined period of time, the period of time sufficient to allow the data switch to switch from output audio mode to input audio mode; and means to query the database and/or operate the machinery in response to data input by the user and output information in response to user input;

whereby the system reduces loss of initial data when the user interrupts the speech recognition system by delaying the input of user speech data.

2. A system, as in claim 1, wherein the proximity detector further comprises;

means to detect the distance between the input means and the user; and means to adjust sensitivity of the microphone based on the distance between the microphone and the user;

whereby the system automatically compensates for the distance between the microphone and the user.

3. A system, as in claim 1, wherein the proximity detector further comprises:

means to detect the distance between the user and the machinery; and means to automatically shutdown the machinery when the distance between the machinery and the user exceeds a predetermined distance.

4. A speech recognition system with reduced data loss during barge-in, comprising:

a computer;

input means, attached by the computer, for inputting data from a user;

output means, attached to the computer, for outputting information to the user;

a data switch having an input audio mode and an output audio mode, further comprising;

means to switch from output audio mode to input audio mode when input audio is detected;

audio delay means to delay input audio for a predetermined period of time, the period of time sufficient to allow switching from output audio mode to input audio mode;

whereby the input audio is delayed to allow the user to barge-in without loss of the initial input audio during data switching.

\* \* \* \* \*